United States Patent [19]

Bridigum

[11] 4,453,779

[45] Jun. 12, 1984

[54] ADJUSTABLE VARIABLE LOAD CONTROL VALVE DEVICE

[75] Inventor: Robert J. Bridigum, Plum Borough, Pa.

[73] Assignee: American Standard Inc., Wilmerding, Pa.

[21] Appl. No.: 349,882

[22] Filed: Feb. 18, 1982

[51] Int. Cl.³ .............................................. B60T 8/18
[52] U.S. Cl. ................................. 303/22 A; 303/40
[58] Field of Search ................ 303/23 A, 22 A, 23 R, 303/22 R; 188/195; 303/40, 68; 267/64.19, 64.21

[56] References Cited

U.S. PATENT DOCUMENTS

| | | | |
|---|---|---|---|
| 3,125,379 | 3/1964 | Valentine | 303/22 A X |
| 3,460,872 | 8/1969 | Reno et al. | 303/22 A |
| 3,504,698 | 4/1970 | Frill | 303/22 A X |
| 3,517,971 | 6/1980 | Scott | 303/22 A |
| 3,583,772 | 6/1971 | Reno | 303/22 A |
| 3,730,597 | 5/1973 | Pickert | 303/22 A |

*Primary Examiner*—Douglas C. Butler
*Attorney, Agent, or Firm*—J. Sotak

[57] ABSTRACT

An adjustable variable load brake control valve responsive to the degree of air spring pressure as determined by the load condition of a vehicle for delivering fluid under pressure to the brake cylinder in accordance with the supply fluid pressure as established by a vehicle operator up to a maximum pressure value which is dependent upon the ratio of the effective pressure area upon which the air spring pressure acts on and upon and the effective pressure area upon which the supply fluid pressure acts on and which ratio may be manually changed by increasing or decreasing the effective pressure area subject to the supply fluid pressure.

13 Claims, 1 Drawing Figure

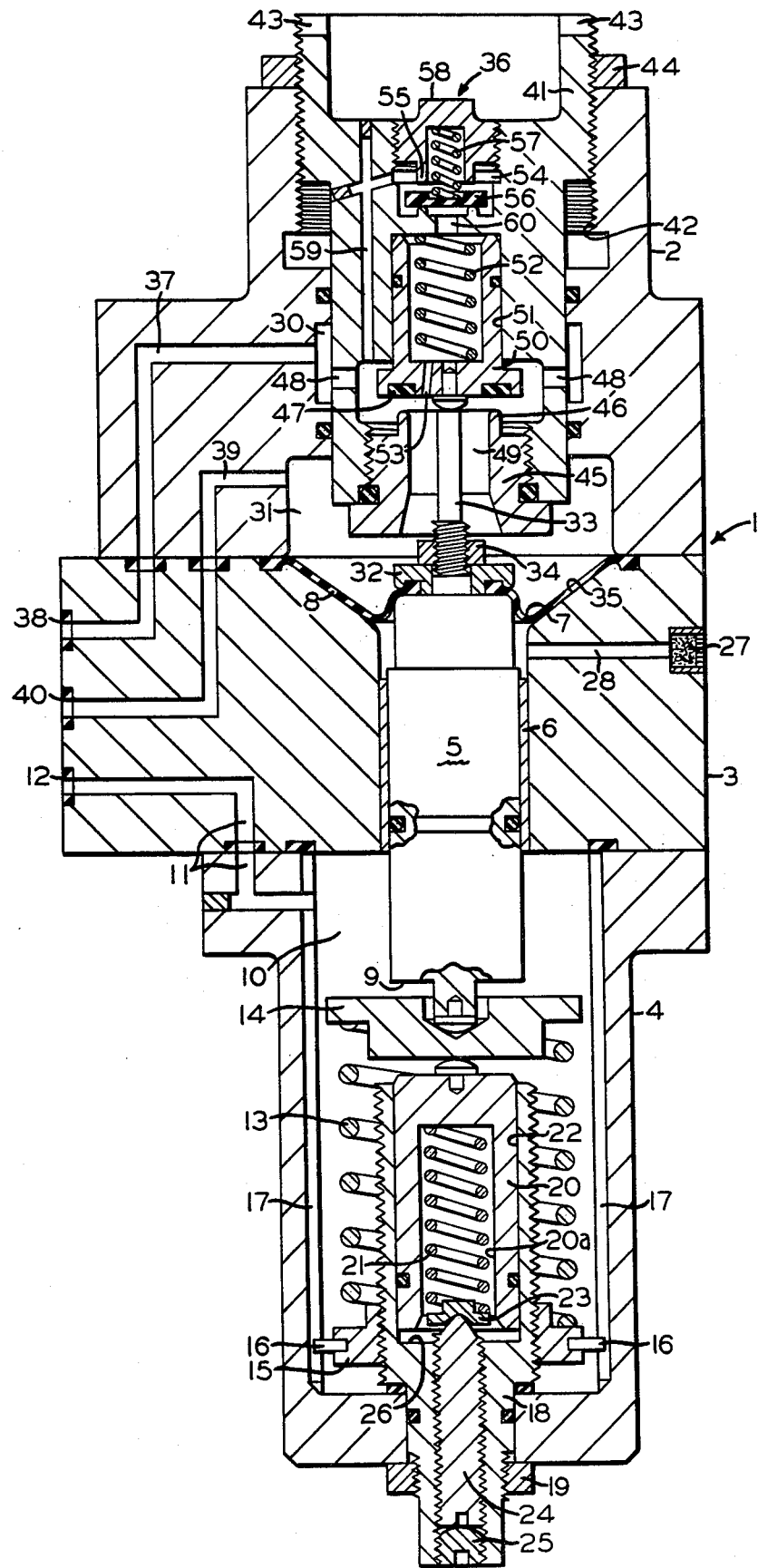

ADJUSTABLE VARIABLE LOAD CONTROL VALVE DEVICE

FIELD OF THE INVENTION

This invention relates to an adjustable brake pressure control valve and more particularly to a variable vehicle load responsive valve device having a manually adjustable cartridge member for changing the effective pressure area of a conical diaphragm operating piston which controls the maximum applicable brake cylinder pressure in accordance with the vehicle load.

BACKGROUND OF THE INVENTION

Presently, the standard variable load control valve device used in mass and/or rapid transit operations is a pressure cut-off valve which limits the maximum braking pressure that is supplied to the brake cylinder in accordance with the load carried by the vehicle. In practice, the different vehicle load conditions are sensed by an air spring which causes the variable load control valve to vary the control pressure in the brake cylinder as shown and described in U.S. Pat. Nos. 3,460,872; 3,504,698; 3,517,971; and 3,583,772. It will be noted that the brake cutoff pressure is determined by the ratio of the effective pressures that are supplied to the top and bottom of the stepped operating piston of the variable load control valve. Since each transit property has different brake and load requirements, it is necessary to offer a multiple of different pressure area ratio pistons and valve springs in order to satisfy the desired brake pressure cutoff value and the brake pressure empty/load ratio. Thus, a large inventory of parts is required to be kept on hand, and each assembled valve is limited to a specific brake application. Hence, there is a need for a universal variable load control valve which will fill the braking requirements of various transit authorities.

OBJECTS AND SUMMARY OF THE INVENTION

Accordingly, it is an object of the present invention to provide a new and improved adjustable variable load control valve device.

Another object of this invention is to provide a unique variable brake pressure control valve which is manually adjustable to satisfy the needs of various braking requirements.

A further object of this invention is to provide a novel adjustable variable brake pressure load control valve device in which the ratio of the effective supply pressure area and the effective air spring pressure area may be manually changed to obtain the desired brake pressure cutoff value.

Yet another object of this invention is to provide an improved adjustable variable load control valve which permits a different piston ratio to be obtained without the need to change or replace any parts.

Yet a further object of this invention is to provide an adjustable variable load device comprising a casing having a supply changer and a delivery and piston chamber, an adjustable cartridge disposed within the housing, a check valve carried by the cartridge for controlling communication between the supply chamber and the delivery and piston chamber, an operating piston movable between an open and closed position, a biasing pressure chamber located at one end of the operating piston for urging the operating piston in one direction to its open position to hold the check valve in its open position, and a resilient diaphragm located at the other end of the operating piston to move the operating piston to its closed position when a certain maximum pressure is reached in the delivery and piston chamber to allow the check valve to move to its closed position.

In accordance with the present invention there is provided an adjustable variable brake pressure control valve which includes a housing having an upper casing section, an intermediate casing section and a lower casing section. The upper and intermediate casing sections define a supply pressure chamber and a delivery and piston chamber. A reciprocable operating piston is disposed within the housing. An adjustable cartridge is screw threaded into the top end of the upper casing section. A check valve is carried by the adjustable cartridge for controlling communication between the supply pressure chamber and the delivery and piston chamber.

A biasing pressure chamber is formed between the lower and intermediate casing sections. The lower end of the reciprocable operating piston is located in the biasing pressure chamber which includes a compression spring and air spring pressure for urging the reciprocable operating piston in an upward direction to cause a stem member to hold the check valve in its open position. An adjustable spring biased auxiliary piston is disposed within the biasing pressure chamber to assist the compression spring when the air spring pressure falls below a certain critical value. The upper end of the reciprocable operating piston is clamped to the inner peripheral portion of a flexible diaphragm which has its outer peripheral portion clamped between the upper and intermediate casing sections. The flexible diaphragm is situated adjacent a conical surface formed in the intermediate casing section so that the effective pressure area on the upper side of the flexible diaphragm is dependent upon the amount of contact area that exists between the underside of the flexible diaphragm and the conical surface. If it is desired to decrease the ratio of effective pressure area on the top of the conical flexible diaphragm and piston in relation to the effective pressure area on the bottom of the piston, the adjustable cartridge is screwed inwardly to increase the amount of contact area between the underside of the flexible diaphragm and the conical surface. Conversely, if it is desired to increase the ratio of the effective pressure area of the top of the conical flexible diaphragm and piston in relation to the effective pressure area on the bottom of the piston, the adjustable cartridge is screwed outwardly to decrease the amount of contact area between the underside of the flexible diaphragm and the conical surface. A lock nut is screw threaded onto the adjustable cartridge for locking it in position. Now when sufficient pressure is conveyed from the supply chamber to the delivery and piston chamber to overcome the compressive force of the spring and the air spring pressure, the reciprocable operating piston is moved downwardly to allow the check valve to assume its closed position. A release valve is carried by the adjustable cartridge to permit the check valve to move from its closed position to its open position when the vehicle operator releases the pressure to the supply chamber.

DESCRIPTION OF THE DRAWINGS

The foregoing objects and other attendant features and advantages of the present invention will become more clearly understood from the following detailed description when considered in conjunction with the accompanying drawing in which the single FIGURE is a schematic elevational view mostly in section, of an adjustable variable load control valve embodying the present invention.

DETAILED DESCRIPTION OF THE INVENTION

Referring to the single FIGURE of the drawing, there is shown an improved adjustable variable load valve device which is generally characterized by the reference numeral 1. The adjustable variable load brake control valve 1 includes three housing portions, namely, an upper casing section 2, an intermediate casing section 3 and a lower casing section 4.

A valve-operating piston 5 is reciprocably mounted in a sleeve or bushing 6 which is fixed in the intermediate casing section 3. The piston 5 incorporates an adjustable upper control pressure area 7 formed by the upper surface of a resilient conical diaphragm 8 and has a lower or air spring pressure area 9 formed by the lower end of the piston. The control pressure area 7 is larger than air spring pressure area 9.

The lower pressure area 9 is exposed and subject to a pre-established air spring pressure in a biasing pressure chamber 10 formed in the lower casing section 4. The biasing pressure chamber 10 is charged to such air spring pressure via a passageway 11 formed in the lower and intermediate casing sections 3 and 2. The port 12 of passageway 11 is connected to the vehicle air spring (not shown) via suitable piping. The level or degree of air spring pressure in chamber 10 is dependent upon load condition of the vehicle. Thus, the amount of air pressure in chamber 10 is pre-established by the vehicle air spring and reflects whether the vehicle is empty or loaded. A first helical compression or biasing spring 13 is disposed in the air spring chamber 10 and urges the conical diaphragm piston 5 upward toward an open supply position which will be defined hereinafter. The biasing spring 13 is compressed between an upper spring seat 14 and a lower spring seat 15. The upper spring seat 14 rests against the lower end of the piston 5, and the lower spring seat 15 is fixed against rotation by a pair of diametrically opposed tabs or tangs 16. The tangs 16 include notches or slots which ride on an associated axially disposed rib 17 formed on either side of the inner wall of the lower casing section 3. Thus, the axial position of the rest 15 may be moved up or down by rotating the adjusting screw 18 which is screwed into a threaded bore in the spring seat 15. Hence, the spring 13 height may be adjusted for varying the compressive force, and after suitable adjustment, the adjusting screw 18 may be locked against inadvertent rotation by lock nut 19. Thus, the spring seat 15 is locked in its adjusted position. An auxiliary or second compression spring 21 is caged in a recess 20a formed coaxially in an auxiliary piston 20 which is reciprocably disposed in a bore 22 formed in the adjusting screw 18. The spring 21 is compressed between the closed end of the bore 22 and an adjustable spring rest 23. The bottom of the spring rest 23 engages the upper pointed end of an elongated adjusting screw 24 which is screwed into a threaded bore formed in the bottom end of adjusting screw 18. The bottom of the adjusting screw 24 is slotted to permit the insertion of a suitable tool so that screw 18 may be rotated to adjust the compressive force of spring 21. After the spring 21 is properly adjusted, a set screw 25 or the like is inserted into the threaded bore and is seated against the bottom of screw 24 to prevent inadvertent rotation of the adjusting screw 24. It will be appreciated that the auxiliary piston 20 is urged by auxiliary spring 21 toward an operative position in which it is in contact with the bottom side of spring seat 14. Thus, the biasing force of the auxiliary spring 21 is conveyed through auxiliary piston 20 and spring seat 14 to act on the main piston 5. When the chamber 10 is charged with air spring pressure exceeding a predetermined critical value, the auxiliary piston 20 is forced downwardly against the compressive effort of the auxiliary spring 21 to an effective inoperative position. Thus, the biasing effect of the auxiliary spring 21 is removed from the main piston 5. The inoperative position may be defined as the condition in which the bottom peripheral edge of the piston 20 engages the bottom surface of the adjusting screw 18. Thus, in the event of failure or unintentional reduction of the air spring pressure below the predetermined critical value, the auxiliary spring 21 will become effective for insuring, at least, a minimum brake application equivalent to an empty car load condition. It will be seen that an atmospheric vent port 27 and passageway 28 is formed in the intermediate casing section 2 to permit free reciprocable motion without any dash-pot action.

As shown, the upper casing section 2 includes a supply chamber 30 and a delivery and piston chamber 31 which communicates with the upper pressure area 7 of the flexible diaphragm 80. The inner peripheral portion or edge of the resilient diaphragm 8 is clamped between the top of the piston 5 and an annular diaphragm follower or collar member 32 through which passes a piston stem 33. A locking nut 34 securely holds the annular collar 32 against the top of piston 5 so that the center of the diaphragm 8 is air tight. The outer peripheral portion or edge of diaphragm 8 is clamped between upper and intermediate casing sections 2 and 3. In viewing the single FIGURE, it will be seen that the underside of the flexible diaphragm 8 cooperates with a conical or conoidal surface 35 formed on the intermediate top surface of the intermediate member 3 to determine the effective pressure area 7 as will be described in greater detail hereinafter.

A check or cut-off and release valve assemblage 36 is physically located in the upper casing section for controlling communication between the supply chamber 30 and the delivery and piston chamber 31. The supply chamber 31 is connected via passageway 37 and port 38 to a suitable source of air pressure, such as, a vehicle storage reservoir (not shown) while the delivery and piston chamber 31 is connected via passageway 39 and port 40 to a brake cylinder device (not shown). As shown, the cut-off and release valve assemblage is disposed in an externally threaded cartridge or carrier 41 which is screwed into the threaded bore 42 formed in the top or upper end of the upper casing section 2. It will be appreciated that the cartridge 41 is axially adjustable; namely, it may be turned in or out by placing a suitable tool into the diametrically opposed slots 43 formed in the top side thereof. After the cartridge 41 and, in turn, the check valve assemblage 36 have been properly adjusted, a lock nut 44 is screw threaded onto the cartridge 41 to prevent inadvertent rotation. It will be seen that the check valve assemblage includes a check valve seat member 45 which is screw threaded into a threaded bore formed in the bottom end of the cartridge body. The seat member 45 has an annular seat 46 onto which a check valve 47 is intended to be seated to close off communication between the supply chamber 30 and the delivery and piston chamber 31. That is, in its seated or closed position the communication between passageways 48 form in the cartridge 41 and a passageway 49 formed in the seat member 45 is cut off so that the fluid path between the supply chamber 30 and the delivery and piston chamber 31 is shut off. Conversely, when the check valve is in its unseated or open position, there is communication between the two chambers. The check valve 47 is carried by a valve-carrying member 50 which is axially slidably disposed in an extended bore 51 formed in the intermediate portion of the cartridge 41. A check valve spring 52 urges the valve-carrying member 50 downwardly toward its seated or closed position. A port or through passage 53 is formed in the bottom wall of slide valve member 50 for communication between the upper and lower sides so that the check valve is balanced on both sides.

The release valve assemblage is operably disposed in a release valve chamber 54 which is located above the check valve assemblage. The release valve assemblage includes an annular release valve seat member 55 which is formed as an integral part of the body of the cartridge 41. A release valve 56 is disposed in the valve chamber 54 and is urged by a compression spring 57 and the supply pressure via passageway 59 acting on the upper side thereof toward its seated or retaining position on the valve seat 55. The valve spring 57 is compressed between the release valve 56 and a cap nut 58 which is screw threaded into the top side of the cartridge 41. The release valve chamber 54 and, in turn, the upper side of the release valve 56 is put in communication with the supply chamber 30 via passageway 59 and passageways 48. An open or through bore 60 is located between the underside of the release valve 56 and the check valve spring chamber. Thus, the release valve 56 will be retained in its seated or retaining position on valve seat 55 so long as the effect of the supply fluid pressure combined with the force of release valve spring 57 acting on the upper side of the valve 56 is greater than that of the delivery fluid pressure acting on the underside thereof. Now when the supply pressure in chamber 30 which acts on the upper side of release valve 56 is reduced or released, such as when a brake reduction or release is initiated, the delivery fluid pressure acting on the underside of the release valve 56 causes it to become unseated or assume its released position so that there is reduction of fluid pressure acting on the upper side of the check valve 47. Thus, the check valve 47 becomes unseated by the higher delivery fluid pressure acting on the underside thereof so that there is a reduction or release in the delivery fluid pressure which corresponds to the reduction of the supply pressure.

It will be appreciated that suitable sealing O-rings and gaskets are appropriately disposed in the presently described variable load control device 1 to prevent leakage of fluid under pressure between the various chambers.

In describing the operation of the adjustable variable brake control valve 1, it will be assumed that the supply reservoir (not shown) is charged with fluid at a normal operating pressure and that the spring chamber 10 is charged with fluid at the pressure prevailing in the air spring (not shown) determined by the existing vehicle load. It will be understood that until such time that the operator initiates a brake application, the supply chamber 30 and the delivery and piston chamber 31 are void of fluid pressure so that the main piston 5 is retained by spring 13 and the air spring pressure in chamber 10 in its normal or supply position as shown with the check valve 47 in its unseated position and with the release valve 56 in its seated position.

Now when the operator initiates a service brake application, the associated control devices cause operating fluid, the pressure of which is dependent upon the degree of application initiated by the operator, to be supplied to the supply chamber 30 via port 38 and passageway 37, and then it flows through passageway 48, through the unseated check valve 47, through passageway 49 to the delivery and piston chamber 31. The fluid pressure in the delivery and piston chamber 31 flows through passageway 39 and port 40 and to the brake cylinder device (not shown) for effecting a brake application on the vehicle. At the same time the fluid pressure in the delivery and piston chamber 31 acts on the pressure area 7 which is exhibited by the diaphragm 8. In viewing the single FIGURE of the drawing, it will be seen that the pressure area 7 of the conical diaphragm 8 is slightly greater than the pressure area 9 of piston 5, which in the present instance may be, for example, approximately 2:1. As will be described hereinafter, the pressure area ratio may be adjusted or changed as the situation warrants for various brake applications. Now if the degree of brake application initiated by the operator is of such a low level that the pressure of the operating fluid acting on pressure area 7 is insufficient for overcoming the opposing force of spring 16 and the air spring pressure in chamber 13 acting on pressure area 9, then the respective positions of the main piston 5 and check valve 47 will remain unchanged.

However, if the operator now either initiates a new service brake application or effects an increase of the already existing low level service brake application to the extent that the degree of operating pressure now acting on the pressure area 7 is sufficient for overcoming the opposing forces acting on pressure area 9, then the main piston is moved downwardly out of its normal position to a closed or non-supply position. Under this condition, the check valve spring 52 moves the check valve 47 downwardly against seat 46 to cause the check valve to assume its cutoff position. Thus, the flow of operating fluid under pressure to the delivery and piston chamber 31 to the brake cylinder is cut off at the level determined by the compression setting of the spring 13 and the degree of air spring pressure in chamber 10, even though the operator may attempt to further increase the brake application by effecting an additional increase of the fluid pressure in the supply chamber 30. Once seated, check valve 47, with the delivery pressure balanced on both sides thereof, is retained in its seated position by spring 52 until such time that the supply pressure in chamber 54, acting on the upper side of the release valve 56 is vented to atmosphere or released. Now when the operator effects a reduction or release of the brake application and the supply pressure is reduced sufficiently, the delivery pressure on the underside of the release valve 56 causes it to become unseated. Thus, in service brake operations, the maximum limit of the fluid pressure deliverable to the brake cylinder, namely, the pressure at which the main piston 5 is moved to its cutoff position, is determined by the existing load condition of the vehicle, that is, the degree of air spring pressure in chamber 10. Thus, the force of the air spring pressure in air spring chamber 10 plus the force of the spring 13, is the amount of force that must be overcome by the operating fluid pressure which is in delivery and piston chamber 31.

It will be understood that all brake applications whether service or emergency are released when the operator in a conventional manner causes actuation of the appropriate control valve device to effect release of the pressure in supply chamber 30.

Thus, when a brake release is initiated by releasing the supply fluid pressure in chamber 30, the upper side of release valve 56 is relieved of the supply fluid pressure so that the delivery fluid pressure on underside thereof is effective in unseating the release valve 56 from seat 55. The delivery pressure acting on the upper side of the check valve 47 is permitted to escape past the unseated release valve 56 so that the delivery pressure now acting only on the underside of the check valve 47 causes it to become unseated. It will be seen that with the check valve 47 unseated, the fluid pressure acting on the pressure area 7 of the conical diaphragm piston 5 is relieved so that the piston 5 will return to its normal position under the influence of spring 13 and air spring pressure in chamber 10 to completely unseat the check valve 47. Thus, the fluid pressure from the brake cylinder may flow to port 40, through passageway 39, through delivery chamber 30, through passageway 49 past unseated check valve 56, through chamber 30, through passageway 37, to port 38 and to an atmospheric port (not shown) in the control device.

As previously mentioned, the presently described adjustable variable load control valve 1 is a differential type of pressure operating device in which the effective surface area on the top of the main piston 5 may be manually changed. In order to change the ratio of the pressure area 7 relative to the pressure area 9, it is simply necessary to loosen and unscrew the lock nut 44 which is threaded onto the top of cartridge 41. After insertion of an appropriate tool into slots 43, the cartridge 41 may be rotated either in a clockwise or counterclockwise direction as viewed from the top end of the device. If the tool is turned in a clockwise direction, the cartridge 1 will move inwardly so that the check valve body 50 will act through stem 33 to depress the main valve 5 against spring 13 and/or spring 21. As the piston moves downwardly, more of the underside of diaphragm 8 will be caused to engage more of the surface area of the conical fustrum surface 35 so that less of the diaphragm is freely suspended, and the effective pressure area 7 is decreased so that the ratio between the upper pressure area 7 and lower pressure area 9 is decreased. Conversely, if the tool is turned in a counterclockwise direction, the cartridge 1 will move outwardly so that check valve body 50 will allow the springs 13 and 21 to move the main piston 5 upwardly. Thus, as the main piston moves upwardly, more of the underside of the diaphragm 8 becomes disengaged with the conical surface 35 so that the amount of freely suspended diaphragm is increased. That is, the pressure area 7 is increased so that the ratio between the upper pressure area 7 and lower pressure area 9 is increased. In practice, the diaphragm 8 may be totally disengaged from the conical surface 35 so that the ratio of the pressure area between top and bottom of the main piston 5 is at a maximum value. Thus, the ratio of the pressure areas may be readily externally adjusted to compensate for various supply and air spring pressures as well as for the compressive forces of the various springs.

It will be understood that various changes and modifications may be made by those skilled in the art without departing from the spirit and scope of the invention and, therefore, it will be apparent that all variations, alterations and equivalents of this invention are herein meant to be encompassed by the appended claims.

Having now described the invention, what I claim as new and desired to secure by Letters Patent, is:

1. An adjustable variable valve device comprising,
   (a) a casing having a supply chamber and a delivery and piston chamber,
   (b) an externally adjustable cartridge disposed within said casing,
   (c) a check valve carried by said cartridge for controlling communication between said supply chamber said delivery and piston chamber,
   (d) an operating piston movable between an open and closed position,
   (e) a biasing pressure chamber remote from said delivery and piston chamber and formed at one end of said operating piston for urging said operating piston in one direction to its open position to hold said check valve in its open position, and
   (f) a resilient diaphragm connected to the other end of said operating piston to move said operating piston in the opposite direction to its closed position when a certain maximum pressure is reached in said delivery and piston chamber to allow said check valve to move to its closed position.

2. The adjustable variable valve device as defined in claim 1, wherein said adjustable cartridge is screw threaded the top end of said casing.

3. The adjustable variable valve device as defined in claim 2, said resilient diaphragm is situated adjacent a conical surface formed in said casing so that the effective pressure area on the upper side of said resilient diaphragm is dependent upon the amount of contact areas that exist between the underside of said resilient diaphragm and said conical surface.

4. The adjustable variable valve device as defined in claim 3, wherein said adjustable cartridge may be screwed inwardly to increase the amount of contact area between the underside of said resilient diaphragm and said conical surface to proportionally reduce the effective pressure area on the upper side of said resilient diaphragm.

5. The adjustable variable valve device as defined in claim 3, wherein said adjustable cartridge may be screwed outwardly to decrease the amount of contact area between the underside of said resilient diaphragm and said conical surface to proportionally enlarge the effective pressure area on the upper side of said resilient diaphragm.

6. The adjustable variable valve device as defined in claim 2, wherein a lock nut is screw threaded onto said adjustable cartridge for locking it in position.

7. The adjustable variable valve device as defined in claim 1, wherein said operating piston is clamped to the center periphery of said resilient diaphragm.

8. The adjustable variable valve device as defined in claim 7, wherein said casing includes an upper, an intermediate and a lower section, and the outer periphery of said resilient diaphragm is clamped between said upper and intermediate sections.

9. The adjustable variable valve device as defined in claim 1, said biasing pressure chamber includes at least one compression spring and air spring pressure for acting on the bottom of said operating piston to urge said operating piston in an upward direction.

10. The adjustable variable valve device as defined in claim 9, wherein a spring biased auxiliary piston is disposed in said biasing pressure chamber to assist said compression spring when said air spring pressure falls below a certain critical pressure value.

11. The adjustable variable valve device as defined in claim 10, wherein said spring biased auxiliary piston may be externally adjustable to change the certain critical pressure value of said air spring pressure.

12. The adjustable variable valve device as defined in claim 1, wherein a release valve is carried by said adjustable cartridge to permit said check valve to move from its closed position to its open position.

13. An adjustable variable load control valve comprising,
   (a) a housing having supply and delivery ports,
   (b) a valve member for establishing communication between a supply pressure chamber and a delivery and piston chamber in said housing,
   (c) a reciprocable piston disposed in said housing for controlling the operation of said valve member,
   (d) a spring and air pressure chamber remote from said delivery and piston chamber for biasing one end of said reciprocable piston and urging said reciprocable piston to an open position,
   (e) a flexible diaphragm clamped to the other end of said reciprocable piston, said flexible diaphragm having its underside cooperatively associated with a conical surface, and
   (f) an externally adjustable cartridge disposed in said housing and cooperating with said valve member for allowing axial movement of said reciprocable piston so that the effective pressure area of said flexible diaphragm may be manually increased and decreased to vary the ratio of the pressure area of said flexible diaphragm in relation to the pressure area of said one end of said reciprocable piston.

* * * * *

UNITED STATES PATENT AND TRADEMARK OFFICE
CERTIFICATE OF CORRECTION

PATENT NO. : 4,453,779
DATED : June 12, 1984
INVENTOR(S) : Robert J. Bridigum

It is certified that error appears in the above-identified patent and that said Letters Patent are hereby corrected as shown below:

Column 8, line 14, before "said" insert --and--

Column 8, line 30, before "the" insert --into--

Signed and Sealed this

Second Day of October 1984

[SEAL]

Attest:

GERALD J. MOSSINGHOFF

Attesting Officer

Commissioner of Patents and Trademarks